United States Patent [19]

Yamaguchi et al.

[11] Patent Number: 4,972,404
[45] Date of Patent: Nov. 20, 1990

[54] OPTICAL DISC

[75] Inventors: Tadahiro Yamaguchi; Toshikazu Yoshino, both of Saitama, Japan

[73] Assignee: Pioneer Electronic Corporation, Tokyo, Japan

[21] Appl. No.: 311,806

[22] Filed: Feb. 17, 1989

[30] Foreign Application Priority Data

Sep. 29, 1988 [JP] Japan ............................... 63-127754

[51] Int. Cl.$^5$ ..................... G11B 7/24; G01D 15/34
[52] U.S. Cl. .................................... 369/284; 369/283; 369/291; 369/280; 346/137
[58] Field of Search ............... 369/283, 284, 286, 291; 206/439; 346/137

[56] References Cited

U.S. PATENT DOCUMENTS 3,761,013 9/1973 Schuster ............................... 206/439
4,504,842 3/1985 Odawara ............................... 369/284

Primary Examiner—Stuart S. Levy
Assistant Examiner—Kenneth B. Wells
Attorney, Agent, or Firm—Sughrue, Mion, Zinn, Macpeak & Seas

[57] ABSTRACT

An optical disc is disclosed in which a pair of circular disc substrates are arranged in confronted relation with each other with their signal recording layers being directed inwardly and are bonded to each other through spacers at inner and outer peripheral portions. A vent hole is formed in a main surface of one of the disc substrates. A disc label is bonded on the disc substrate so as to cover the vent hole.

10 Claims, 2 Drawing Sheets

OPTICAL DISC

BACKGROUND OF THE INVENTION

The present invention relates to an optical disc and more particularly to an optically read information recording medium within which a space is formed by a pair of disc substrates and spacers that are interposed between the disc substrates.

In an optical disc such as a DRAW (direct read after write), information is recorded as a number of fine pits. It is therefore significant or important to protect a layer where the pits are formed, i.e., a signal recording layer. In order to meet this requirement, there have been developed and proposed optical discs in which a pair of disc substrates are arranged in confronted relation with each other with a signal recording layer of at least one of the pair of disc substrates being directed inwardly.

FIG. 1 shows a typical example of a conventional optical disc. As shown, a pair of disc substrates 1 and 2 made of transparent resinous material are provided, respectively, with signal recording layers 3 and 4. The disc substrates 1 and 2 are arranged with their signal recording layers 3 and 4 being confronted with each other and are bonded through inner and outer spacers 5 and 6 with, for example, adhesives. Thus, an aerial space 7 is formed between the two disc substrates 1 and 2, thereby protecting the signal recording layers 3 and 4. A vent hole 8 is formed in the outer spacer 6 so that the space 7 is in communication with the outside through the vent hole 8.

In such an optical disc, since atmospheric air may flow through the vent hole 8 into the space 7, even if the atmospheric pressure is changed, there is an equilibrium between the atmospheric pressure and a pressure within the space 7. Thus, undesired warpages in the disc substrates 1 and 2 may be avoided during the change in atmospheric pressure. However, in contrast, there is raised a problem in that foreign matter such as dust will enter into the space 7 when the atmospheric air is introduced into the space 7 through the vent hole 8. Although FIG. 1 shows a thickness of the optical disc on an enlarged scale, the inner and outer spacers 5 and 6 are actually very thin. It is, therefore, difficult to form the vent hole 8 in such a restricted or narrowed space.

SUMMARY OF THE INVENTION

Accordingly, an object of the present invention to provide an optical disc that is free from the above-noted difficulty.

An object of the invention is to provide an optical disc in which a permeability between the inner space of the disc and the outside is ensured to a satisfactory extent while preventing the entrance or entrainment of foreign matter. This leads to a significant reduction of manufacturing cost and a remarkable enhancement in manufacturing efficiency.

According to the present invention, there is provided an optical disc wherein a pair of circular disc substrates are arranged in confronted relation with each other with their signal recording layers being directed inwardly and are bonded to each other through spacers at inner and outer peripheral portions; a vent hole is formed in a main surface of at least one of the disc substrates and a disc label is bonded on the disc substrate so as to cover the vent hole.

These and other objects, features and advantages of the present invention will become more apparent by reading the following description in conjunction with the accompanying drawings in which:

DESCRIPTION OF THE PREFERRED EMBODIMENTS

Figure 1:
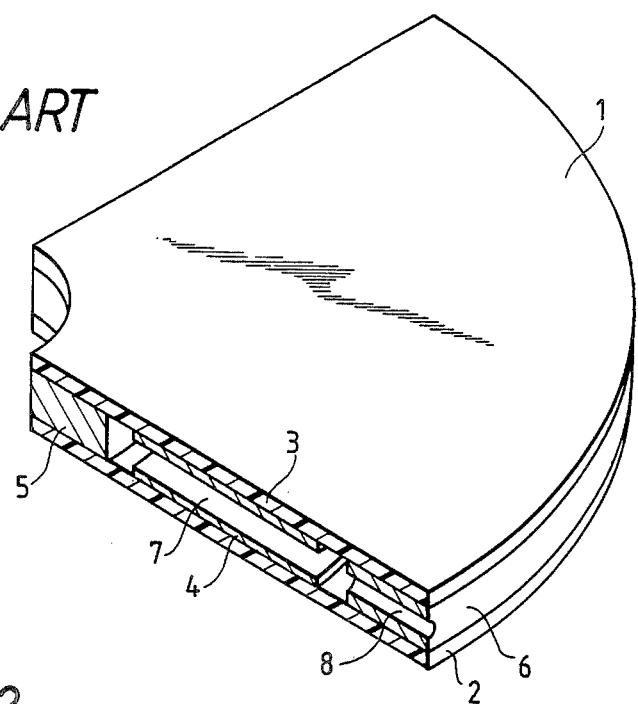
FIG. 1 is a fragmentary perspective view of an optical disc according to the prior art.
Figure 2:
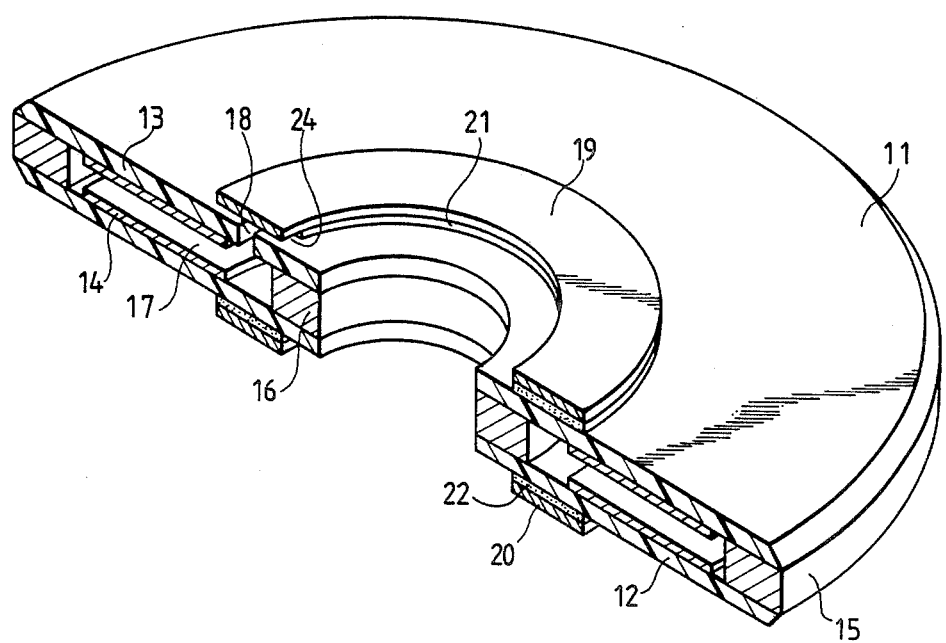
FIG. 2 is a fragmentary perspective view of an optical disc according to an embodiment of the invention.
Figure 3:
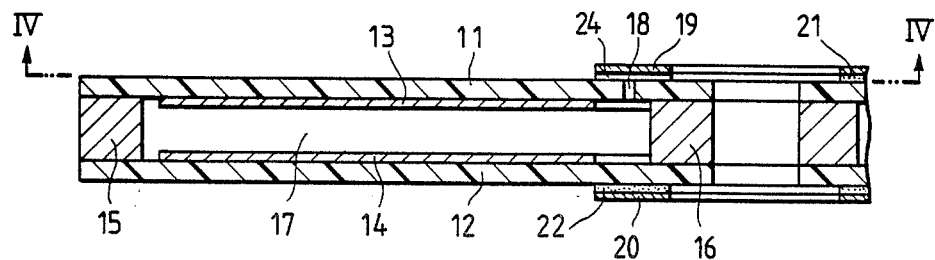
FIG. 3 is a cross-sectional view of the optical disc shown in FIG. 1.

The present invention will now be described in more detail with reference to the accompanying drawings:

Referring now to FIGS. 2 and 3, there are shown an optically read information recording disc which comprises a pair of circular disc substrates 11 and 12 made of transparent resinous material in the same size and dimension. Signal recording layers 13 and 14 are provided with the disc substrates 11 and 12, respectively. The pair of disc substrates 11 and 12 are confronted with each other with their signal recording layers being directed inwardly. Between the circular disc substrates 11 and 12, there are interposed large and small annular spacers 15 and 16 corresponding to the parts where no recording layers 13 and 14 are present, that is, in the inner and outer circumferential portions. The disc substrates 11 and 12 are bonded to each other through the spacers 15 and 16 with adhesives or the like. Accordingly, an inner space 17 is defined by the disc substrates 11 and 12 and the annular spacers 15 and 16. Thus, the signal recording layers 13 and 14 are safely protected within the space 17 interrupted from the outside.

For instance, in a main surface of one of the circular disc substrates 11, a fine vent hole 18 is formed between the signal recording layer 13 provided on the disc substrate 11 and the inner annular spacer 16. The atmospheric air will flow through the vent hole 18 into the inner space 17. Accordingly, even if the atmospheric pressure is changed, there is an equilibrium between the pressure within the inner space 17 and the atmospheric pressure at all the times. It is possible to avoid an undesired warpage in the disc substrates 11 and 12 caused by the atmospheric pressure change.

Annular disc labels 19 and 20 are attached to the inner circumferential portions of the outer surfaces of the disc substrates 11 and 12 with adhesives 21 and 22. It should be noted that the disc labels 19 and 20 are made of paper or resinous material. The above-described vent hole 18 is covered by the disc label 19. As is apparent from FIG. 4, the adhesive 21 that is used for attaching the disc label 19 to the circular disc substrate 11 is not applied to all the surface of the disc label 19. Namely, a communication region 24 where no adhesive layer 21 is present is formed in a radial direction of the label 19. The disc label 19 is attached to the circular disc substrate 11 so that the communication region 24 may be in communication with the vent hole 18. Therefore, the vent hole 18 is not blocked by the adhesive layer 21 or the disc label 19. The vent hole 18 is in communication with the outside through the communication region 24. Thus, the permeability or fluid-communication between the inner space 17 and the outside may be ensured. Also, since the adhesive layer 21 is extremely thin, a cross-sectional area of the communication region 24 communicating with the vent hole 18 is extremely small. Thus, the entrance of dust through the communication region 24 may be avoided, so that the inner space 17 of the optical disc may always be kept clean.

Figure 4:
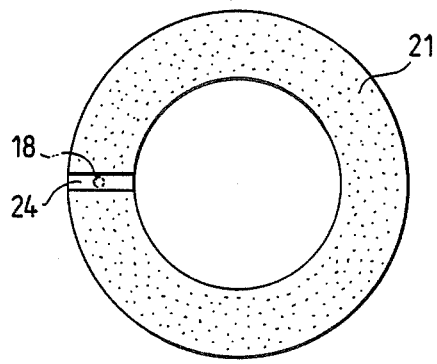
FIG. 4 is a plan view as viewed from the line IV—IV of FIG. 3.
Figure 5:
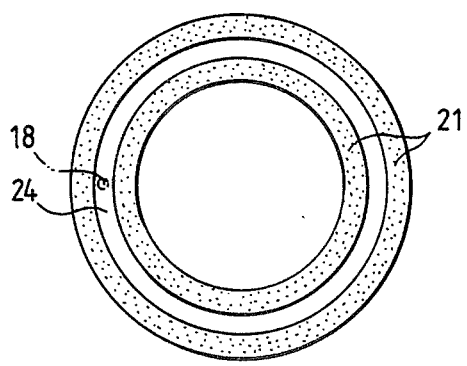
FIG. 5 is a fragmentary perspective view of a modification according to the present invention.

FIG. 5 shows a modification of the optical disc shown in FIGS. 2 to 4. As shown in FIG. 5, the communication region 24 formed in the adhesive layer 21 in communication with the vent hole 18 formed in the disc substrate 11 is in the form of an annular shape over the entire circumstance of the disc label 19. The communication region 24 is solely in communication with the inner space 17 through the vent hole 18 and is out of communication with the outside. In such an arrangement, it is necessary to form the disc label 19 of material having a permeability such as paper. This may ensure the permeability between the inner space 17 and the outside and at the same time may prevent the entrainment of the foreign matter. Incidentally, it should be noted that, in the structure shown in FIG. 4, in which the communication region 24 of the adhesive layer 21 is in communication with the outside, it is unnecessary to impart the permeability to the disc label per se.

In the foregoing embodiments, only one vent hole 18 is formed in one of the disc substrates 11. It is however possible to form one or more additional vent holes. Also, a diameter and the number of the vent holes are not limited to those shown in the embodiments.

In addition to the foregoing advantages of the present invention, the invention may enjoy the following advantages. The formation of the vent hole on the main surface of the planar disc substrate may be performed simultaneously with the formation of the disc substrate, or otherwise may readily be performed by punching the disc substrate after the formation of the disc substrate. This leads to a further improvement in manufacturing efficiency in low cost.

We claim:

1. An optical disc comprising:
a pair of circular disc substrates at least one of which has a signal recording layer, said pair of disc substrates being confronted with each other with said signal recording layer being directed inwardly;
a pair of annular spacers for carrying outer and inner circumferential portions of said disc substrates thereby defining an inner space in cooperation with said pair of disc substrates;
a disc label attached to an outer surface of at least one of the disc substrates, said label being thin relative to said at least one of the disc substrates; and
a communication means for communicating said inner space and atmospheric air outside of the disc with each other, said communication means being covered but not blocked by said disc label.

2. The optical disc as recited in claim 1, wherein said communication means includes at least one vent hole formed in a main surface of the disc substrate.

3. The optical disc as recited in claim 2, wherein said communication means includes a communication region in communication with an opening of said vent hole.

4. The optical disc as recited in claim 3, wherein said disc label includes a first region where adhesive is applied and a second region where no adhesive is applied, said communication region being defined by said first region and said main surface of said disc substrate.

5. The optical disc as recited in claim 4, wherein said communication region extends radially in communication with atmospheric air outside of said optical disc.

6. The optical disc as recited in claim 4, wherein said communication region is an annular region in said second region, said annular region being substantially closed by said first region and said main surface of the disc substrate.

7. The optical disc as recited in claim 5, wherein said disc label is made of non-permeable material.

8. The optical disc as recited in claim 5, wherein said disc label is made of permeable material to thereby allow communication with atmospheric air.

9. The optical disc as recited in claim 8, wherein said disc label is made of paper.

10. The optical disc as recited in claim 2, wherein said vent hole opens into said inner space between said signal recording layer and an inner spacer of said pair of annular spacers.

* * * * *